United States Patent [19]

Overton

[11] 4,067,119

[45] Jan. 10, 1978

[54] METHOD OF DRYING BLOOD

[76] Inventor: Glen Overton, 304 W. High St., Dowagiac, Mich. 49047

[21] Appl. No.: 734,329

[22] Filed: Oct. 20, 1976

[51] Int. Cl.² ............................................. F26B 7/00
[52] U.S. Cl. .......................................... 34/12; 34/60; 34/110
[58] Field of Search ...................... 34/12, 17, 60, 110, 34/112

[56] References Cited

U.S. PATENT DOCUMENTS 3,664,033  5/1972  Fritze et al. .............................. 34/12

Primary Examiner—John J. Camby
Attorney, Agent, or Firm—Hill, Gross, Simpson, Van Santen, Steadman, Chiara & Simpson

[57] ABSTRACT

Animal and poultry blood from slaughter houses and poultryprocessing plants is efficiently dried without loss or destruction of the desirable protein and amino acids content thereof and without creating pollution problems. In one embodiment, the raw blood is ground to break up gelatin-like globules, and masses of impurities such as hair, feathers, hide and the like, has the plasma coagulated at low temperatures, is next finely comminuted to form a free-flowing slurry and is then deposited onto the descending side of the top of a heated drier drum and formed into a film by one or more spreader rolls. In another embodiment, the raw blood is comminuted in a high speed hammer mill, screened, and fed to the drier drum, coagulated on top of the drum and formed into a film by the spreader rolls. The film is rapidly dried and scraped from the ascending side of the drum in the form of a dried sheet which can then either be flaked or pulverized to provide a high grade blood meal product. Liquid dripping from the drier drum is recirculated back to the drum in advance of the layer deposited from the main feed. Vapors above the drying cylinder are scrubbed before being released to the atmosphere and represent the only effluents from the process.

18 Claims, 3 Drawing Figures

U.S. Patent  Jan. 10, 1978  4,067,119
Fig. 1
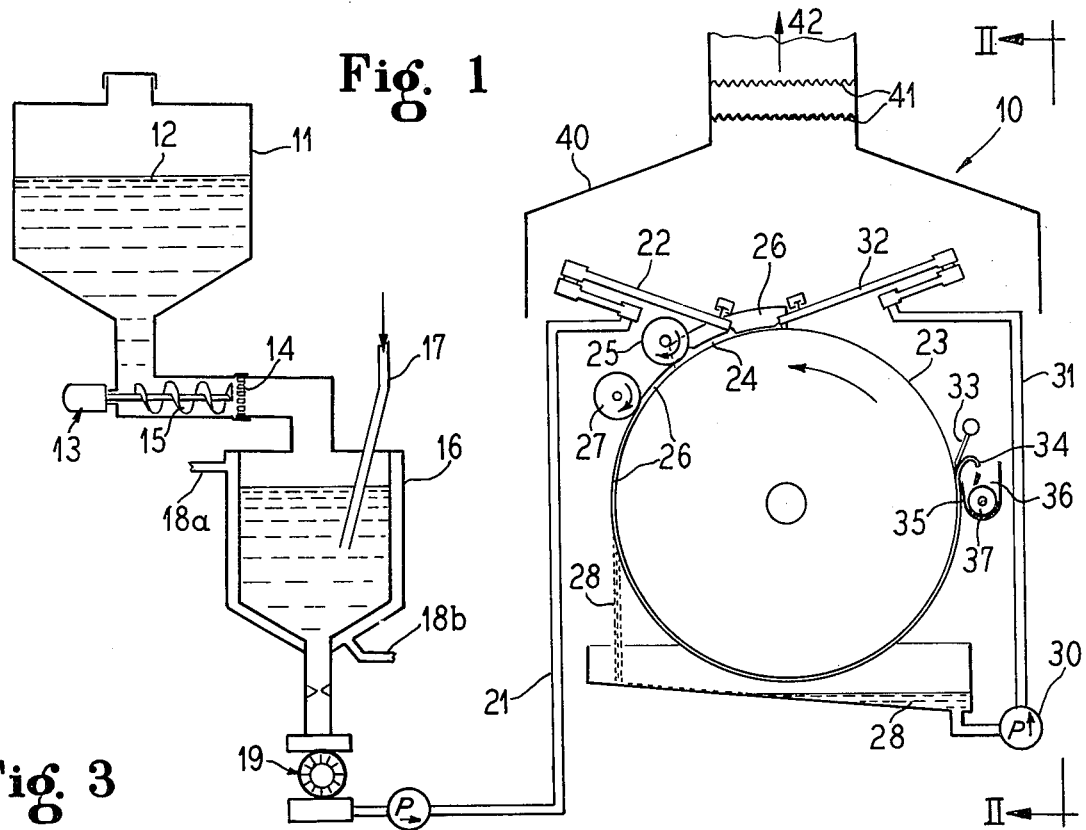
Fig. 3
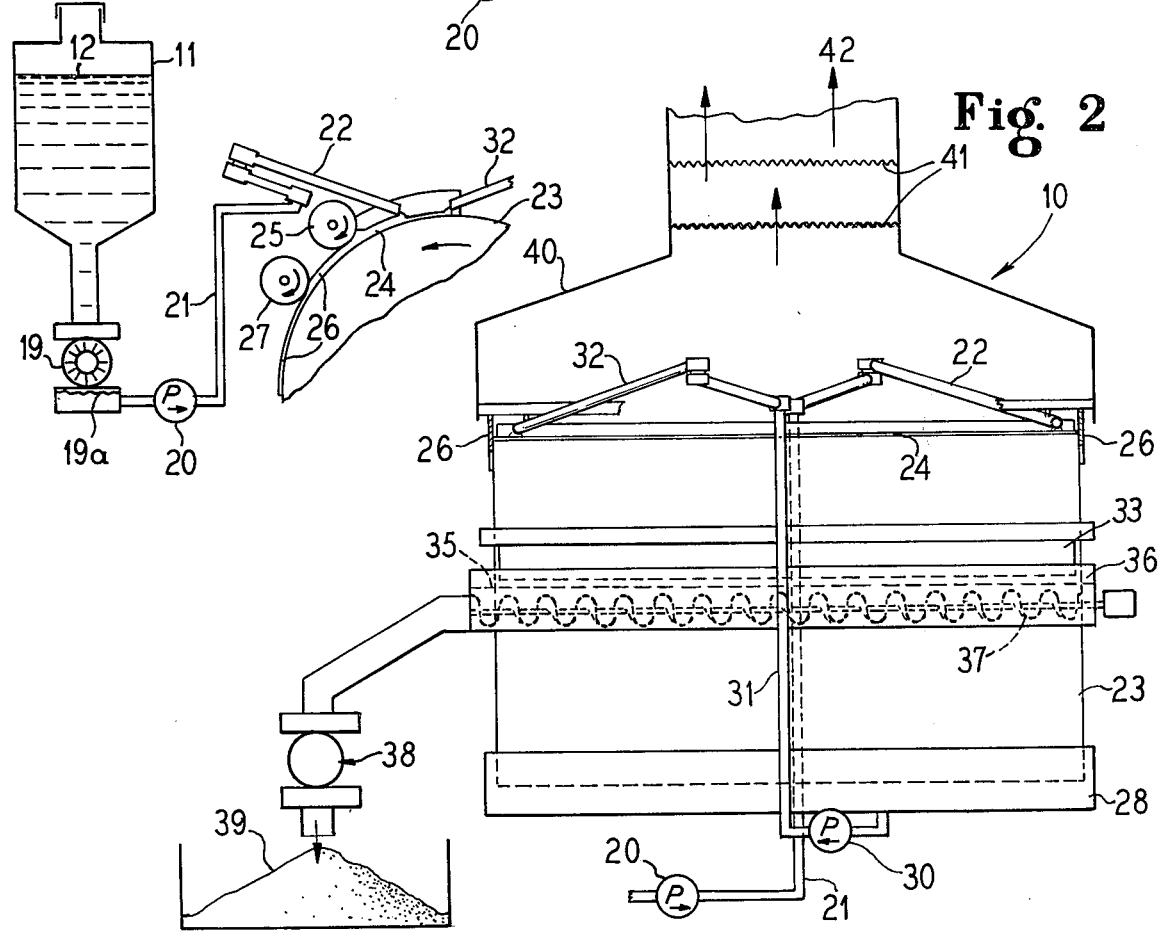
Fig. 2

METHOD OF DRYING BLOOD

FIELD OF THE INVENTION

This invention relates to the art of drying protein liquids and slurries, such as raw animal or poultry blood without destruction of desirable protein and amino acid contents and without creating pollution problems. Specifically, the invention deals with drying of animal or poultry blood on a single cylinder drying machine in such a manner that the valuable blood meal ingredients are preserved and polluting effluents are not discharged.

PRIOR ART

Known methods of drying blood involve prolonged heating at high temperatures, resulting in destruction of valuable protein and amino acids in the blood, overdrying of the more easily dried blood ingredients, producing dust particles which are lost in the process, and production of polluting effluents.

SUMMARY OF THIS INVENTION

According to one embodiment of this invention, raw animal or poultry blood such as received from slaughter houses and poultry processing plants and containing impurities such as hair, feathers, hide, skin and the like, is passed through a grinder such as a conventional meat grinder to break up the lumps of solid particles and globules to form a free-flowing liquid. This liquid is then coagulated with steam in a heat exchanger maintained at temperatures of about 140° – 150° F. These low temperatures prevent destruction of the protein molecules and preserve the amino acid content of the raw blood. The resulting slurry of coagulated blood and water is passed through a high speed comminuting machine such as a hammer mill to form a readily flowable slurry which is then deposited on top of a single rotating dryer drum at the descending side of the drum to form a layer on the drum periphery. The drum is heated to a surface temperature sufficiently high to evaporate the water content of the blood but sufficiently low to prevent destruction and overdrying of the plasma content of the blood. The drum is rotated sufficiently fast so that the dried blood film is removed from the hot drum surface before overdrying occurs. In order to obtain a rapid heat transfer from the drum periphery to the blood layer on the drum, one or more spreader rolls are provided on the descending side of the drum to spread the blood layer into a thin film uniformly along the entire length of the drum. The drum may be heated to temperatures of 250° – 350° F. and rotated at speeds so that the blood does not remain in contact with the drum for more than about 2 minutes, a contact time of less than 1 minute being preferred. The dried blood film is scraped from the ascending side of the rotating drum and is broken up into flakes or crushed and screened to form a powder. Liquid draining from the descending side of the cylinder called "stick-water" is collected at the bottom of the drum and pumped to the top of the drum where it is deposited on the bare drum surface in advance of the main feed. The main feed of blood is distributed along the length of the drum in advance of the first applicator roll by a swinging pendulum feed pipe. The stick water is fed to the drum by a similar pendulum feed pipe.

In another embodiment of the invention, the raw blood is coagulated on the drier drum, thus eliminating the pre-grinding and steam coagulation. In this embodiment, the raw blood is fed through a high speed hammer mill, screened, and deposited on top of a heated drier drum sufficiently in advance of a spreader roll to be coagulated to the consistency of raw hamburger. The coagulated blood on the drum is then squeezed to a flat layer by a first spreader roll and next formed into a film by a second spreader roll.

It is then an object of this invention to provide an efficient inexpensive process of drum drying raw blood without destruction of the protein and amino acid content of the blood and without creating pollutant effluent problems.

A further object of this invention is to coagulate and dry raw animal and poultry blood on a single heated rotating cylinder in such a manner as to prevent destruction of the blood molecules while eliminating discharge of the effluents containing pollutants.

A further object of this invention is to provide a method of drying blood for producing high quality meal which includes a high speed comminution of the raw blood and a coagulation of the comminuted blood and a drum drying of the comminuted coagulated blood without ever allowing the blood plasma to reach temperatures which will destroy the protein and amino acid content thereof.

Another object of the invention is to provide a method of producing blood meal where the only effluent is an easily scrubbed vapor.

Other and further objects of this invention will become apparent to those skilled in this art from the following detailed description of the annexed sheet of drawings, which by way of preferred example illustrates apparatus for carrying out the method of this invention.

ON THE DRAWINGS

FIG. 1 is a diagrammatic end elevational view of apparatus used in one embodiment of the method of this invention.

FIG. 2 is a view taken generally along the line II—II of FIG. 1.

FIG. 3 is a fragmentary view similar to FIG. 1 but showing apparatus used in another embodiment of the method of this invention.

AS SHOWN IN THE DRAWINGS

The apparatus 10 of FIGS. 1 and 2 includes a storage tank 11 for raw animal or poultry blood 12 as received from a slaughter house or poultry processing plant. The tank 11 discharges to a meat grinder 13 where the blood 12 is forced through a disc 14 containing holes of a desired size by means of a feeding auger 15. The ground blood is then collected in a water jacketed tank or heat exchanger 16 and live steam is introduced through an inlet 17 to coagulate the blood. Water is introduced into the jacket of the tank 16 at 18a and drained at 18b to maintain the temperature of the blood in the tank at about 140° – 150° F.

Coagulated blood from the tank 16 is fed through a high speed comminuter machine 19, such as a hammer mill, where the coagulated blood plasma is finely ground and intimately intermixed with the water content of the blood and condensate from the steam inlet 17 to form a free flowing liquid slurry which is pumped by a pump 20 through a feed line 21 to a pendulum feed pipe 22 overlying a steam heated rotating drier drum 23. As shown, the drum rotates counterclockwise and the comminuted coagulated blood forms a layer 24 on top of the drum at the descending side thereof in advance of a first spreader roll 25. As shown in FIG. 2, the pendulum feed pipe 22 forms the blood layer 24 along the entire length of the drum 23 and end dams 26 prevent draining of the layer 24 over the ends of the drum. The spreader roll 25 presses the blood layer 24 forming a film 26 on the drum periphery which film may be further pressed by a second spreader roll 27 downstream from the roll 25. The film 26 is thinner than the layer 24 and its thicknesses are regulated by the nips between the spreader roll and the drum.

Liquid draining from the descending side of the drum 23, known as "stick water" 28 is collected in a pan 29 underlying the drum and pumped by a pump 30 through a feed line 31 to a pendulum feed tube 32 which deposits the stick water on the bare surface of the drum 23 in advance of the layer 24 deposited by the feed pipe 22. This permits the thin stick water to be preheated and somewhat thickened before it reaches the layer 24 where it is comingled with the comminuted coagulated blood to re-enter the nip between the drum and the spreader roll 25.

A scraper 33 is provided on the ascending side of the drum 23 in advance of the discharge from the stick water feed tube 32 to scrape the dried film of blood solids 34 from the drum. The film slides over an apron 35 to a trough 36 where it is conveyed by a screw auger conveyor 37 to one end of the drum 23 for feeding through a grinder or flaking machine 38 to form the finely powdered or flaked blood meal 39.

A hood 40 is mounted over the drum 23 and feed tubes 22 and 32 to receive vapors from the drum which are passed through scrubbers 41 before being released at 42 to the atmosphere.

Therefore, the only discharge from the apparatus 10 according to the method of this invention is the finished dried blood meal 39 and scrubbed water vapor 42 which will not pollute the atmosphere.

The drum 23 is heated so that its periphery will have a temperature of about 250° – 350° F, and is rotated at speeds so that the film 26 does not remain in contact with the heated drum periphery for more than about 2 minutes with 1 minute being a preferred drying time. Because of this low temperature and fast heat treatment, all of the original protein content and amino acids of the blood are preserved and only the water content of the blood is removed. Since blood contains about 18 – 20% solids and the balance water, the blood meal product 39 will be substantially the full solids content of the entering raw blood 12. Because the coagulated blood plasma is finally comminuted, the easier dry solids content of the plasma is intiminately admixed with the solids which are more difficult to dry and a heat transfer occurs in the layer 24 and film 26 which prevents the pre-drying of the easier drying solids content to form a dust. As a result, the film layer 34 scraped off the drum by the scraper 33 is cohesive and free from dust particles which could be entrained in the risng vapor passing through the hood 40.

The spreader rolls 25 and 27 can be unheated or heated to temperatures not greater than the drum 23. The rolls are driven clockwise to cooperate with the counterclockwise driven drum 23 and can rotate at the same peripheral speed as the drum periphery or at a faster or slower peripheral speed. The spreader rolls function to spread the layer 24 evenly across the entire length of the drum 23 and to press the layer into a film of a controlled thickness which is capable of being dried in the length of travel between the initial deposition of the blood on the drum and the point at which the dried film 34 is scraped from the drum. The nip between the first spreader roll 25 and the drum 23 is preferably wider than the nip between the following spreader roll 27 and the drum. Widths of the nips can be adjusted to minimize flow-through of stick water but the water content of the layer 24 is such that some stick water will drain from the drum into the collecting pan 29.

In the embodiment of the invention illustrated in FIG. 3, the pre-grinder 13 and the steam coagulator 16 are eliminated. As shown the modified apparatus 10a includes the storage tank 11 for the raw blood 12 which feeds directly to the high speed hammer mill 19. This mill 19 discharges to a fine screen 19a which only permits flow of a very fine slurry to the pump 20. The screen may vary from 20 to 80 mesh for example. The screened comminuted blood is then fed as by pump 20 to the pendulum feed pipe 22 and deposited on top of the drum 23 where it is heated to coagulating temperatures of not more than about 150° F. forming a coagulated layer 24 having the consistency of raw hamburger. This layer 24 is squeezed and flattened by the first spreader roll 25 which holds back the thicker layer 24 for a sufficient time to complete coagulation in the layer or pond behind the spreader roll. The film 26 which passes between the drum 23 and roll 25 is then thinned down by the second spreader roll 27. The remainder of the method is the same as in FIGS. 1 and 2.

In the embodiment of the method of FIG. 3, the blood is coagulated on the drum 23 without being diluted with condensate from the steam coagulation step used in the embodiment of FIGS. 1 and 2 and the high speed hammer mill 19 and screen 19a acting on the raw blood provides a free-flowing liquid or liquid slurry which is easily handled by the drum 23 to effect the coagulation and drying steps.

From the above description, it is, therefore, to be understood that this invention provides a continuous process of forming dried blood meal from raw animal or poultry blood without destruction of the solids content of the blood and without discharge of effluents which will pollute the atmosphere.

I claim as my invention:

1. The method of drying blood without destruction of blood solids or discharge of polluting effluents which comprises comminuting the blood to break up globules and lumps therein, coagulating the plasma in the blood at low temperatures, pressing the comminuted coagulated blood on a rotating drier drum heated to temperatures sufficient to evaporate the water content of the blood without destroying or forming a dust from the solid content of the blood to form a film on the drum, drying the film on the drum as it rotates with the drum, scraping the dried film from the drum, and breaking up the film to form a dried blood meal of desired particulate size.

2. The method of drying animal and poultry blood from slaughter houses and poultry processing plants without destruction of blood solids or discharge of polluting effluents which comprises finely comminuting the raw blood to break up globules and solid masses therein, coagulating the plasma in the comminuted blood at low temperatures on top of a rotating drier drum heated to temperatures of about 250° – 350° F, pressing the coagulated blood on the drum to form a film on the drum surface of desired thickness, drying the film on the drum as it rotates with the drum, scraping the dried film from the drum, recirculating stick water draining from the drum back to the bare surface of the drum in advance of the blood being coagulated on the drum, and rotating the drum at a speed sufficient to keep the blood solids at temperatures insufficient to destroy the protein and amino acid content of the blood.

3. The method of drying animal and poultry blood from slaughter houses and poultry processing plants without destruction of blood solids or discharge of polluting effluents which comprises grinding the raw blood to break up globules and solid masses therein, injecting steam into the ground blood to coagulate the blood plasma, maintaining the temperature of the blood being coagulated below about 150° F, finely comminuting the coagulated blood, spreading the comminuted coagulated blood on top of a rotating drier drum heated at temperatures of about 250° – 350° F, pressing the spread layer of the comminuted coagulated blood deposited on top of the drum to form a film on the drum, drying the film on the drum, scraping the dried film from the drum, collecting stick water draining from the drum, spreading the stick water on the top of the drum in advance of the layer of comminuted coagulated blood deposited on top of the drum and rotating the drum at speeds sufficient to keep the blood film on the drum for less than about 2 minutes.

4. The method of claim 1 including the preliminary step of grinding the blood to break up globules and lumps therein prior to coagulating the plasma.

5. The method of claim 1 including the step of injecting steam into the blood to coagulate the plasma and maintaining the temperature of the blood being coagulated at about 140° – 150° F.

6. The method of claim 1 including the added step of collecting stick water draining from the drum and recirculating the stick water back to the bare drum surface in advance of the blood layer.

7. The method of claim 1 including the step of recirculating stick water draining from the drum back to the drum surface for recovery of solids therein.

8. The method of claim 2 including the steps of scrubbing vapors evaporated from the blood as it is dried on the drum and releasing pollutant free scrubbed vapors to the atmosphere.

9. The method of claim 2 including the steps of depositing the blood on the descending side of the drum adjacent the top of the drum and scraping the dried blood on the ascending side of the drum below the top of the drum.

10. The method of claim 2 wherein the blood is coagulated with live steam and is maintained at temperatures below about 150° F.

11. The method of claim 3 including the steps of collecting vapors from the method, scrubbing the collected vapors to remove pollutants therein and discharging the scrubbed vapors to the atmosphere as the only effluent of the method.

12. The method of claim 3 wherein the fine comminution step is effected in a hammer mill.

13. The method of claim 3 wherein the pressing step is effected by a spreader roll cooperating with the drum.

14. The method of claim 1 wherein the coagulation step is effected on top of the rotating drier drum in advance of the pressing step.

15. The method of claim 2 wherein the blood is comminuted in a high speed hammer mill, screened, and fed to the drier drum for the coagulation and drying steps.

16. The method of claim 2 wherein the comminuted blood is fed directly to the drier drum for the coagulating and drying steps.

17. The method of claim 2 wherein the coagulating step is effected by depositing the comminuted blood on top of the heated drier drum.

18. In the method of drying blood without destruction of blood solids, the steps of comminuting the blood to break up globules and solid masses therein, coagulating the comminuted blood at low temperatures on top of a rotating heated drier drum, pressing the coagulated blood on the drum to form a film on the drum surface of desired thickness, drying the film on the drum as it rotates with the drum, scraping the dried film from the drum, recirculating stick water draining from the drum back to the surface of the drum in advance of the blood being coagulated on the drum, and rotating the heated drum at a speed sufficient to keep the blood solids at temperatures insufficient to destroy the protein and amino acid content of the blood.

* * * * *